(12) United States Patent
Munjal et al.

(10) Patent No.: US 8,918,656 B2
(45) Date of Patent: Dec. 23, 2014

(54) POWER SUPPLY ENGAGEMENT AND METHOD THEREFOR

(75) Inventors: Ashish Munjal, Round Rock, TX (US);
Jaydev Reddy, Austin, TX (US);
Michael J. Roberts, Austin, TX (US)

(73) Assignee: Dell Products, LP, Round Rock, TX (US)

(*) Notice: Subject to any disclaimer, the term of this patent is extended or adjusted under 35 U.S.C. 154(b) by 1417 days.

(21) Appl. No.: 12/495,231

(22) Filed: Jun. 30, 2009

(65) Prior Publication Data

US 2010/0332873 A1 Dec. 30, 2010

(51) Int. Cl.
*G06F 1/00* (2006.01)
*G06F 1/32* (2006.01)

(52) U.S. Cl.
CPC .................................. *G06F 1/3203* (2013.01)
USPC .......................................................... 713/300

(58) Field of Classification Search
USPC .......................................................... 713/300
See application file for complete search history.

(56) References Cited

U.S. PATENT DOCUMENTS

| | | | | |
|---|---|---|---|---|
| 6,166,934 | A * | 12/2000 | Kajouke et al. | 363/65 |
| 7,535,122 | B2 * | 5/2009 | Visairo-Cruz et al. | 307/80 |
| 2004/0027099 | A1 * | 2/2004 | Fujii | 323/234 |
| 2004/0165407 | A1 * | 8/2004 | Umeda et al. | 363/65 |
| 2004/0215990 | A1 * | 10/2004 | Allen et al. | 713/320 |
| 2007/0079364 | A1 | 4/2007 | Abels et al. | |
| 2007/0083861 | A1 * | 4/2007 | Becker et al. | 717/174 |
| 2010/0037078 | A1 * | 2/2010 | Gross et al. | 713/340 |
| 2010/0277000 | A1 * | 11/2010 | Humphrey et al. | 307/80 |

FOREIGN PATENT DOCUMENTS

WO WO 2009007459 A3 * 1/2009

OTHER PUBLICATIONS

U.S. Appl. No. 12/200,020, filed Aug. 28, 2008.
U.S. Appl. No. 12/487,570, filed Jun. 18, 2009.
U.S. Appl. No. 12/330,230, filed Dec. 8, 2008.
U.S. Appl. No. 12/362,625, filed Jan. 30, 2009.
U.S. Appl. No. 12/423,453, filed Apr. 14, 2009.
U.S. Appl. No. 12/260,477, filed Oct. 29, 2008.

* cited by examiner

*Primary Examiner* — Nimesh G Patel
(74) *Attorney, Agent, or Firm* — Larson Newman, LLP

(57) ABSTRACT

An information handling system includes a plurality of power supply units (PSUs) to supply power to one or more system components. For each PSU of the plurality of PSUs, a power conversion efficiency profile for the PSU is determined using a power management control module of the information handling system. The power conversion efficiency profile represents a power conversion efficiency of the PSU for each of one or more power outputs capable of being supplied by the PSU. The power management control module determines a total amount of power to be supplied to a load of the information handling system, and engages a select number of PSUs to provide the total amount of power based on the total amount of power and the power conversion efficiency profiles of the PSUs.

16 Claims, 5 Drawing Sheets

US 8,918,656 B2

POWER SUPPLY ENGAGEMENT AND METHOD THEREFOR

FIELD OF THE DISCLOSURE

This disclosure relates generally to information handling systems, and more particularly relates to engagement of power supply devices in information handling systems.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

Many information handling systems utilize multiple power supply units (PSUs) to provide power to various components. Conventional techniques for utilization of these PSUs, such as engaging all of the PSUs all of the time or engaging as few PSUs as possible to provide a certain load, often result in unnecessary power consumption, thereby increasing the cost and complexity of operating of the information handling systems.

BRIEF DESCRIPTION OF THE DRAWINGS

Embodiments incorporating teachings of the present disclosure are shown and described with respect to the drawings presented herein, in which.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings certainly can be utilized in this application.

Figure 1:
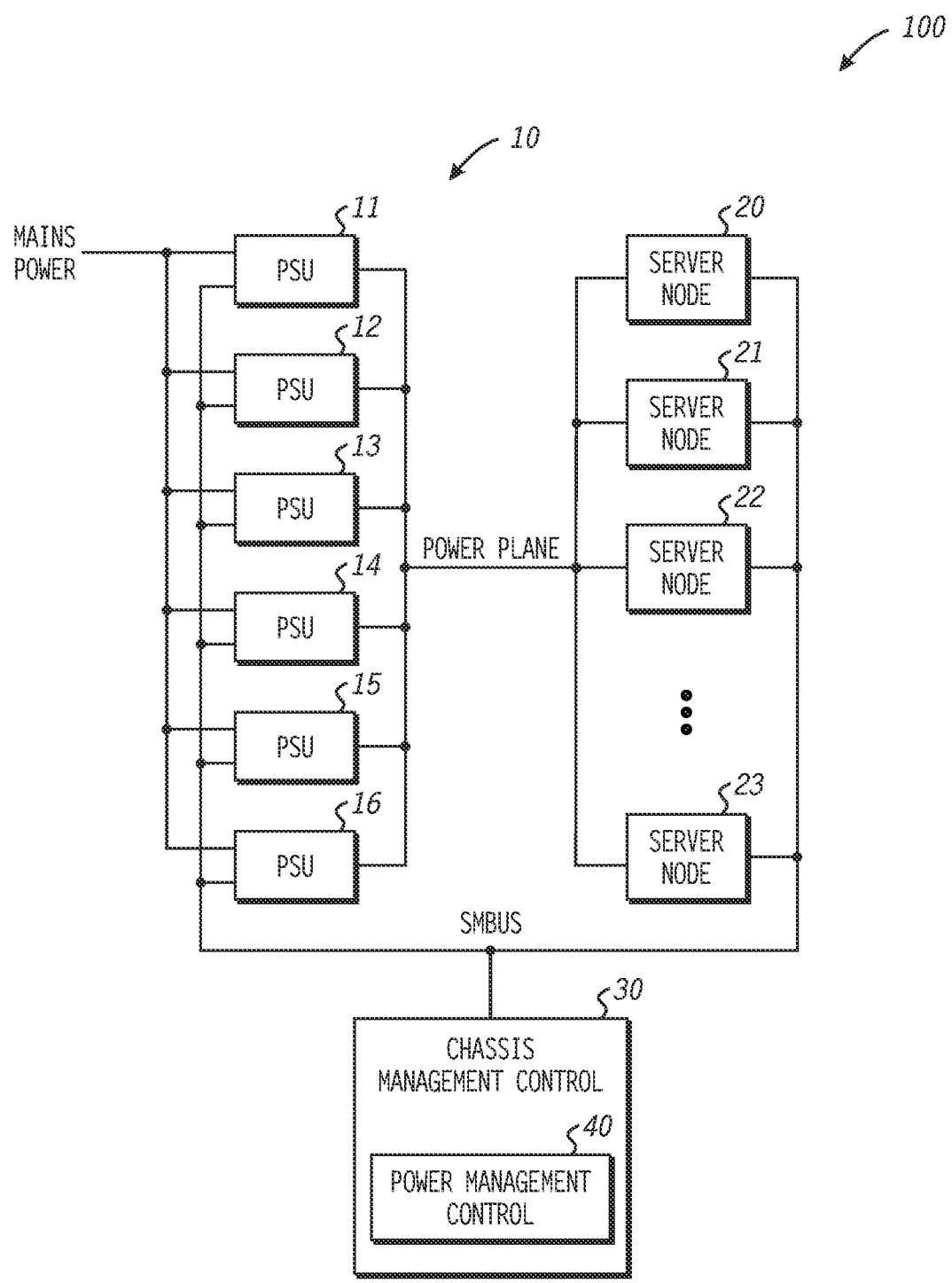
FIG. 1 is a block diagram illustrating an information handling system having a power management control module to control a plurality of power supply units (PSUs) in accordance with a specific embodiment of the present disclosure.

FIG. 1 shows an information handling system 100 in accordance with at least one embodiment of the present disclosure. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

For the purpose of illustration, information handling system 100 is described in an example context of a server chassis with multiple server blades. The techniques described herein can be applied in other information handling system contexts that utilize multiple PSUs without departing from the scope of the present disclosure.

Information handling system 100 includes a power delivery module 10, which includes a plurality of power supply units (PSUs), such as PSUs 11, 12, 13, 14, 15, and 16, server nodes 20, 21, 22, and 23, and a chassis management control module 30. Chassis management control module 30 includes a power management control module 40. Power management control module 40 is configured to selectively engage one or more PSUs of PSUs 11-16 to supply power to server nodes 20-23 based on techniques disclosed herein. An information handling system may include other components in addition to those illustrated that also receive power from power delivery module 10. A PSU is engaged when it is actively providing power to a load, such as information handling system 100. Conversely, a PSU is disengaged when it is not providing power to a load of the information handling system, such as in response to a failure of the PSU, or in response to an action by chassis management control module 30.

Each PSU of PSUs 11-16 has an input to receive electric power via a node labeled "MAINS POWER," a bidirectional control interface terminal connected to a node labeled "SMBUS," and an output connected to a node labeled "POWER PLANE." Each server node of server nodes 20-23 has an input to receive power from node POWER PLANE and a bidirectional control interface terminal connected to node SMBUS. Chassis management control module 30 is connected to node SMBUS. Node SMBUS facilitates communication of information between components of information handling system 100 in accordance with an industry-standard System Management Bus (SMBus) serial interface protocol. For the purpose of example, six PSUs are illustrated at FIG. 1, however a greater or fewer number of PSUs can be included at information handling system 100.

In one embodiment, each PSU of PSUs 11-16 is compliant with a standard power-management protocol known as Power Management Bus (PMBus). The PMBus protocol is implemented over the SMBus protocol, and enables chassis management control module 30 to program, control, and conduct real-time monitoring of each PSU of PSUs 11-16. For example, power management control module 40 is configured to query each PSU of PSUs 11-16 to determine an amount of mains power received at the input of a selected PSU via node MAINS POWER (power input), and to determine an amount of power provided to node POWER PLANE at the output of the selected PSU (power output). Furthermore, power management control module 40 is configured to selectively engage and disengage PSUs of PSUs 11-16 in accordance with efficiency profiles associated with PSUs 11-16, described in greater detail herein. While the PMBus protocol is used in this example, another standard protocol or a proprietary signaling format can be used to implement communication between power management control module 40 and each PSU of PSUs 11-16.

Each server node of server nodes 20-23 can include one or more data processing devices, such as a microprocessor or microcomputer, and each data processing device can include one or more processor cores. Each server node of server nodes 20-23 is operable to access computer-readable medium such as a memory device, which is capable of storing a software program that includes a set of instructions to manipulate at least one processor to perform desired tasks. A server node further can include memory devices, other information storage devices, peripheral interface devices, and the like. Furthermore, a server node can include one or more interfaces (not shown) to support communications and information transfer with another server node, or with other components of information handling system 100 such as shared information storage devices, peripheral interface devices, and the like (not shown at FIG. 1). The SMBus interface is an example of one such interface. In an embodiment, information handling system 100 may include a server rack, and server nodes 20-23 may each represent blade servers.

Chassis management control module 30 is configured to monitor and control components of information handling system 100. For example, chassis management control module can activate and deactivate server nodes in response to a power conservation policy. Chassis management control module 30 includes power management control module 40, which is configured to manage the operation of PSUs 11-16. For example, power management control module 40 can query operational parameters associated with each PSU of PSUs 11-16, determine how many PSUs should be engaged to supply power to node POWER PLANE at a particular time based on the received information, and configure each PSU accordingly. Furthermore, power management control module 40 is configured to determine an efficiency profile for each PSU, and to engage a select number of PSUs based on current operating characteristics of information handling system 100 and based on efficiency analysis that it performs.

The amount of power consumed by a respective server node can vary in response to how the corresponding server node is configured, the selection and utilization of associated hardware components, and the type of computations being performed at the server node, amongst other factors. For example, chassis management control module 30 can place one or more server nodes into a power-conservation mode when demand for computational resources does not require the operation of all server nodes. Power management control module 40 can respond to current power demand of information handling system 100 and dynamically engage a selected number of PSUs based on information included at PSU efficiency profiles to improve the power conversion efficiency of power delivery module 10 in accordance with one or more embodiments of the present disclosure.

Figure 2:
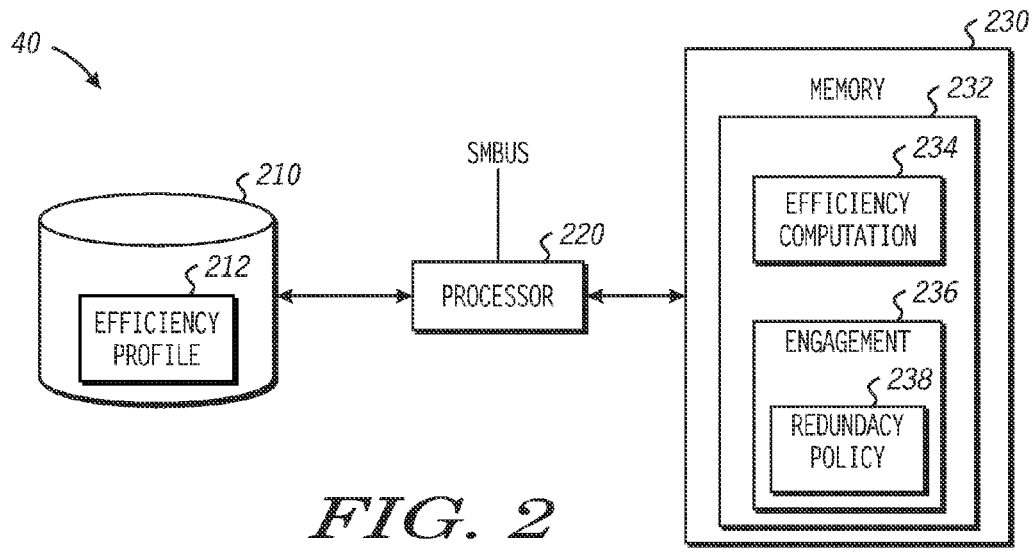
FIG. 2 is a block diagram illustrating the power management control module of FIG. 1 in accordance with a specific embodiment of the present disclosure.

FIG. 2 is a block diagram illustrating power management control module 40 of FIG. 1 in accordance with a specific embodiment of the present disclosure. Power management control module 40 can be implemented using dedicated logic devices, by one or more processors configured to execute a software program, or a combination thereof. In the illustrated example at FIG. 2, power management control module 40 is implemented as one or more processors that execute instructions included in one or more software programs. In particular, power management control module 40 includes a storage component 210, one or more processors 220 or other data processing devices, and a memory device 230. Storage component 210 is configured to store a power conversion efficiency profile 212 in a data structure such as a file, a table, a linked list, or the like. Memory device 230 includes a software program 232, which includes an efficiency computation software module 234 and an engagement software module 236. Engagement software module 236 includes redundancy policy information 238 representative of the PSU redundancy policy to be implemented in information handling system 100.

Processor 220 includes a bidirectional control interface connected to node SMBUS, a bidirectional data interface connected to storage component 210, and a bidirectional data interface connected to memory device 230. Processor 220 is operable to execute software program 232. Processor 220 may be a device that is dedicated to performing only tasks associated with power management control module 40, or it may perform additional processing tasks of information handling system 100.

Storage component 210 can include one or more registers included at data processing device 220, a non-volatile or volatile memory device, or another device operable to store one or more power conversion efficiency profiles, such as power conversion efficiency profile 212. Memory device 230 is configured to store software program 232, and may include a hard-disk drive, a random access memory (RAM), a read only memory (ROM), another type of data memory device, or a combination thereof. Furthermore, storage component 210 can be implemented using storage resources provided by memory device 230. Each of efficiency computation software module 234 and engagement software module 236 includes sets of instructions that can be executed by processor 220. In another embodiment, power management control module 40 can be partially or fully implemented in hardware using a state machine, hard-coded logic devices, and the like.

Power management control module 40 is configured to determine a respective power conversion efficiency profile representing power conversion efficiency characteristics of each corresponding PSU of PSUs 11-16 over a range of operating loads. During operation of information handling system 100, power management control module 40 can periodically request information from each PSU using the PMBus protocol conducted by node SMBUS. For example, management control module 40 can issue a request to PSU 11 inquiring as to an amount of power currently being received by PSU 11, and a corresponding output power currently being provided by PSU 11. Based on this information, management control module 40 can calculate a power conversion efficiency of PSU 11 for the current operating load using the equation:

$$\text{Efficiency} = \frac{(Pin - Pout)}{Pin} \times 100 \qquad \text{Eq. 1}$$

where the variable Pin represents the power consumed by the PSU (power input), and the variable Pout represents the power provided at the output of the PSU (power output). Power management control module 40 can issue similar requests to each PSU of PSUs 11-16 and do so over a range of operating conditions (and an associated range of loads) to compile a power conversion efficiency profile corresponding to each PSU as described in greater detail with reference to FIG. 5.

In one embodiment, a power conversion efficiency profile of a PSU includes a set of data-pairs representative of the power conversion efficiencies of the PSU over a range of output loads or power outputs. In particular, the power conversion efficiency is calculated and expressed based on a quantity referred to as "percent-of-load." Percent-of-load is a fraction, expressed as a percentage, quantifying the power provided by a PSU in relation to a maximum output power capability of the PSU:

$$\text{Percent-of-load} = \frac{P_{out}}{P_{max}} \times 100 \qquad \text{Eq. 2}$$

where the variable Pout represents the power provided at the output of the PSU (power output), and $P_{max}$ represents the specified maximum output power that the PSU is capable of providing. For example, if the maximum output power of a PSU is 1000 watts, and the PSU is currently providing 500 watts of power, the percent-of-load is 50%. Thus, the power conversion efficiency profile of a PSU can include a respective power conversion efficiency corresponding to percent-of-load values ranging from approximately zero to 100% of percent-of-load. The efficiency profile information can be stored in a data structure at storage component 210.

Power management control module 40 is further configured to: 1) determine a total amount of power to be supplied to information handling system 100; 2) determine a minimum number of PSUs needed to provide the total amount of power; 3) determine a select number of PSUs to provide the total amount of power, so as to minimize a total amount of power input to the plurality of PSUs in order to generate the total amount of power; and 4) engage the select number of PSUs. The total amount of power to be supplied to information handling system 100 is the total amount of power currently being consumed by all components included at information handling system 100. The minimum number of PSUs needed to provide the total amount of power may be fewer than the number of PSUs included at power delivery module 10. The minimum number of PSUs is determined based on the maximum power outputs (power delivery capability) of the PSUs. The select number of PSUs that will be engaged to provide the total amount of power may be greater than the minimum number of PSUs if power management control module 40 determines that doing so will reduce a total amount of power input to the plurality of PSUs in order to generate the total amount of power.

Figure 3:
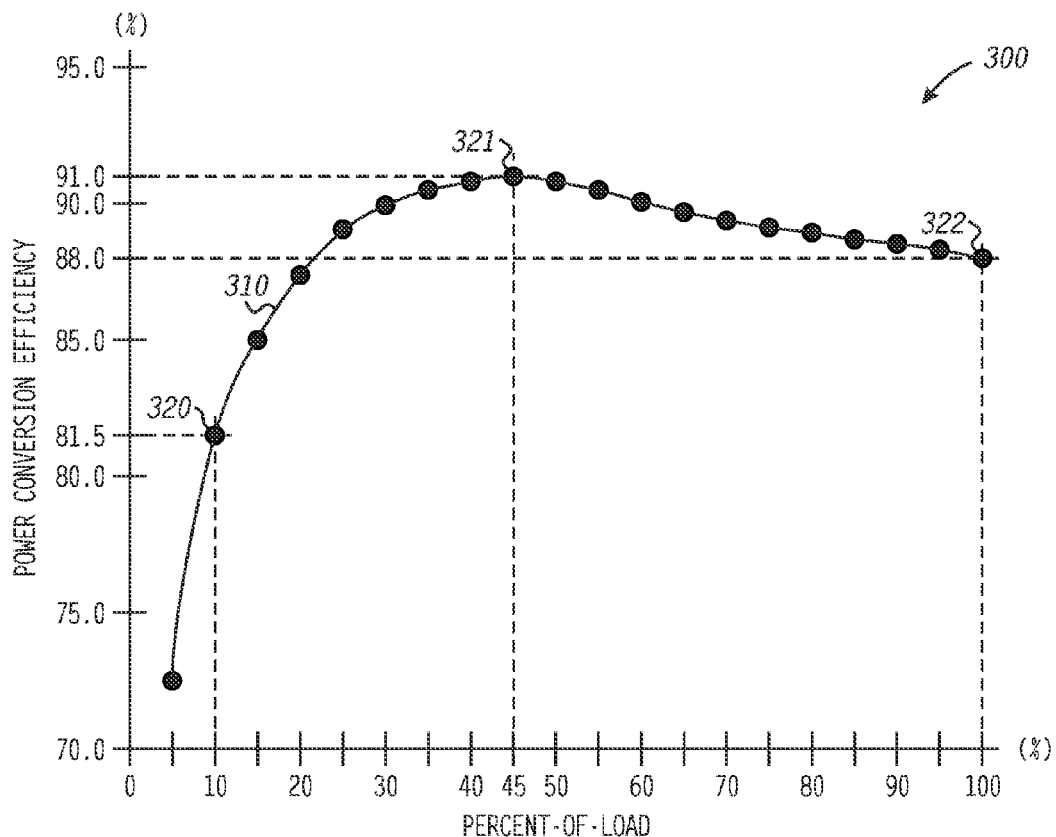
FIG. 3 is a graph illustrating an example power conversion efficiency profile associated with a PSU included at the information handling system of FIG. 1 in accordance with a specific embodiment of the present disclosure.

FIG. 3 is a graph 300 illustrating an example power conversion efficiency profile associated with a power supply unit included at information handling system 100 of FIG. 1 in accordance with a specific embodiment of the present disclosure. Graph 300 includes a horizontal axis representing percent-of-load, and a vertical axis representing power conversion efficiency, expressed as a percentage. Graph 300 includes a data curve 310 representing the power conversion efficiency of a PSU, in relationship to a percent-of-load of the PSU.

A power conversion efficiency profile associates power conversion efficiency in relationship to a percent-of-load. As illustrated by data curve 310, the power conversion efficiency of a PSU can vary over a range of operating load. For example, when the PSU is providing only ten percent of its specified maximum output power, illustrated by data point 320, the power conversion efficiency of the PSU is approximately 81.5%. The power conversion efficiency increases to approximately 91% when the PSU is providing approximately 45% of its specified maximum output power, as illustrated by data point 321. It is not unusual for the power conversion efficiency to decrease as the percent-of-load approaches the specified maximum output power, as illustrated by data point 322, where the PSU is operating at an efficiency of approximately 88% when providing its maximum rated output power. While a large number of data points included at a power conversion efficiency profile is not essential, a greater number of data points, over a large range of percent-of-load, can be advantageous when used by the techniques disclosed herein.

A power conversion efficiency profile, such as that represented by data curve 300, can be compiled over an extended time of operation of information handling system 100. Furthermore, the data included at a power conversion efficiency profile may be updated periodically, e.g. every thousand operating hours, to maintain the accuracy of the data as the efficiency characteristics of the PSU change over time. In an embodiment, a single power conversion efficiency profile can be determined and used to represent one or more of multiple PSUs. For example, if information handling system 100 includes six similar PSUs, a single power conversion efficiency profile can be prepared and used to represent each of the six PSUs. In an embodiment, a power conversion efficiency profile may be predetermined or the associated data may be supplied by a manufacturer or a third party.

Figure 4:
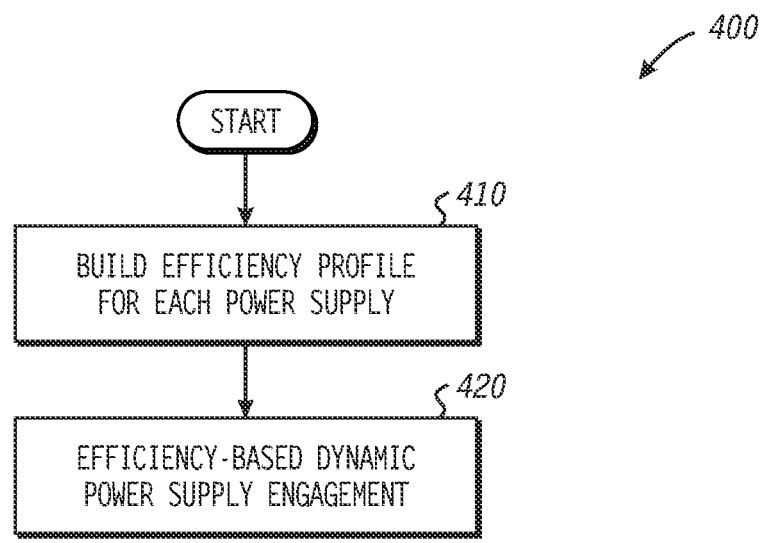
FIG. 4 is a flow diagram illustrating a method for efficiently controlling the plurality of PSUs of the information handling system of FIG. 1 in accordance with a specific embodiment of the present disclosure.

FIG. 4 is a flow diagram 400 illustrating a method for efficiently controlling the plurality of PSUs of information handling system 100 of FIG. 1 in accordance with a specific embodiment of the present disclosure. Flow diagram 400 starts at block 410 where power management control module 40 determines a power conversion efficiency profile for each PSU of information handling system 100. Alternatively, power management control module 40 can determine a single power conversion efficiency profile that can be used to represent the power conversion efficiency of similar PSUs, or PSUs of the same type. The flow proceeds to block 420 where power management control module 40 dynamically engages select subsets of the PSUs based on current power demand of information handling system 100 and based on information provided by the power conversion efficiency profiles.

Figure 5:
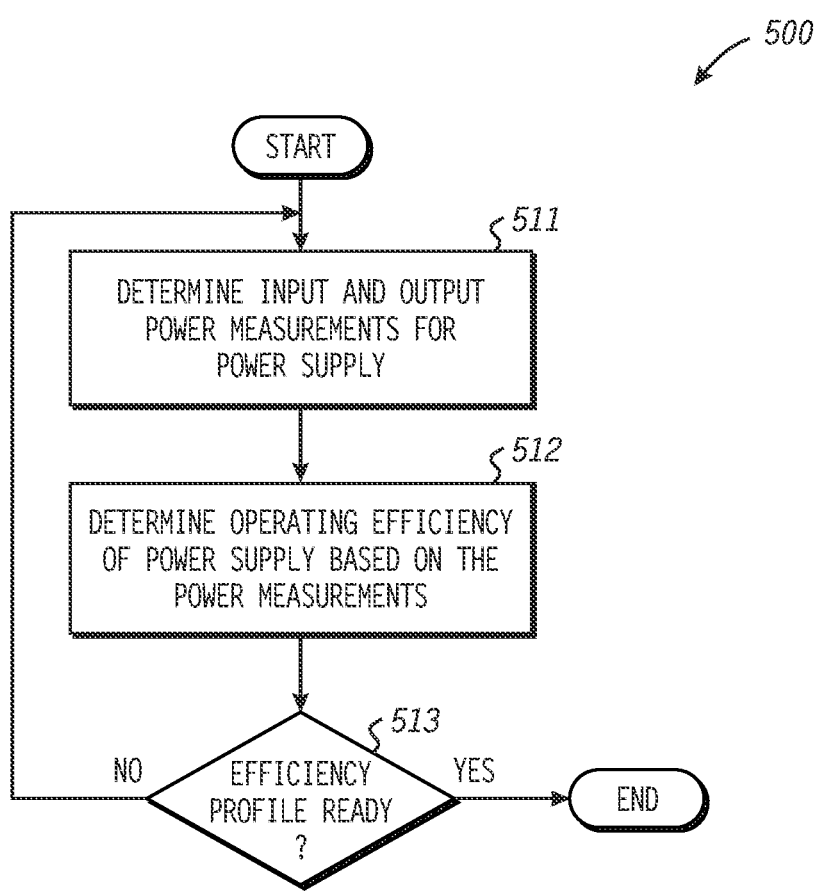
FIG. 5 is a flow diagram illustrating a method for preparing a power conversion efficiency profile for a PSU in accordance with a specific embodiment of the present disclosure.

FIG. 5 is a flow diagram 500 illustrating a method for preparing a power conversion efficiency profile for a PSU in accordance with a specific embodiment of the present disclosure. Flow diagram 500 corresponds to block 410 at flow diagram 400 of FIG. 4. Flow diagram 500 begins at block 511 where power management control module 40 determines input and output power measurements for a PSU at information handling system 100. For example, power management control module 40 can issue requests to the PSU via the PMBus protocol to collect measurements of output power provided by the PSU corresponding to input power received at the PSU. The flow proceeds to block 512 where an operating efficiency of each PSU is determined based on the power measurements using Eq. 1 above. The flow proceeds to decision block 513 where power management control module 40 determines whether the power conversion efficiency profile for the PSU is sufficiently complete. As previously described, a greater or a fewer number of data points can be included at a power conversion efficiency profile, and additional data points can be accumulated at a later time as operation of the information handling system continues. If the power conversion efficiency profile is sufficiently complete, the flow terminates. If the power conversion efficiency profile is not sufficiently complete, the flow returns to block 511. At block 511, additional measurements are performed at a variety of configurations and utilization levels of information handling system 100. Thus, a range of power input and power output data pairs can be collected corresponding to additional values of the PSU percent-of-load. The method of flow diagram 500 can be repeated for each PSU, and for each output terminal of a PSU that includes more than one output terminal capable of providing power. Furthermore, measurements associated with multiple PSUs can be collected in an interleaved manner rather than doing so one PSU at a time.

Figure 6:
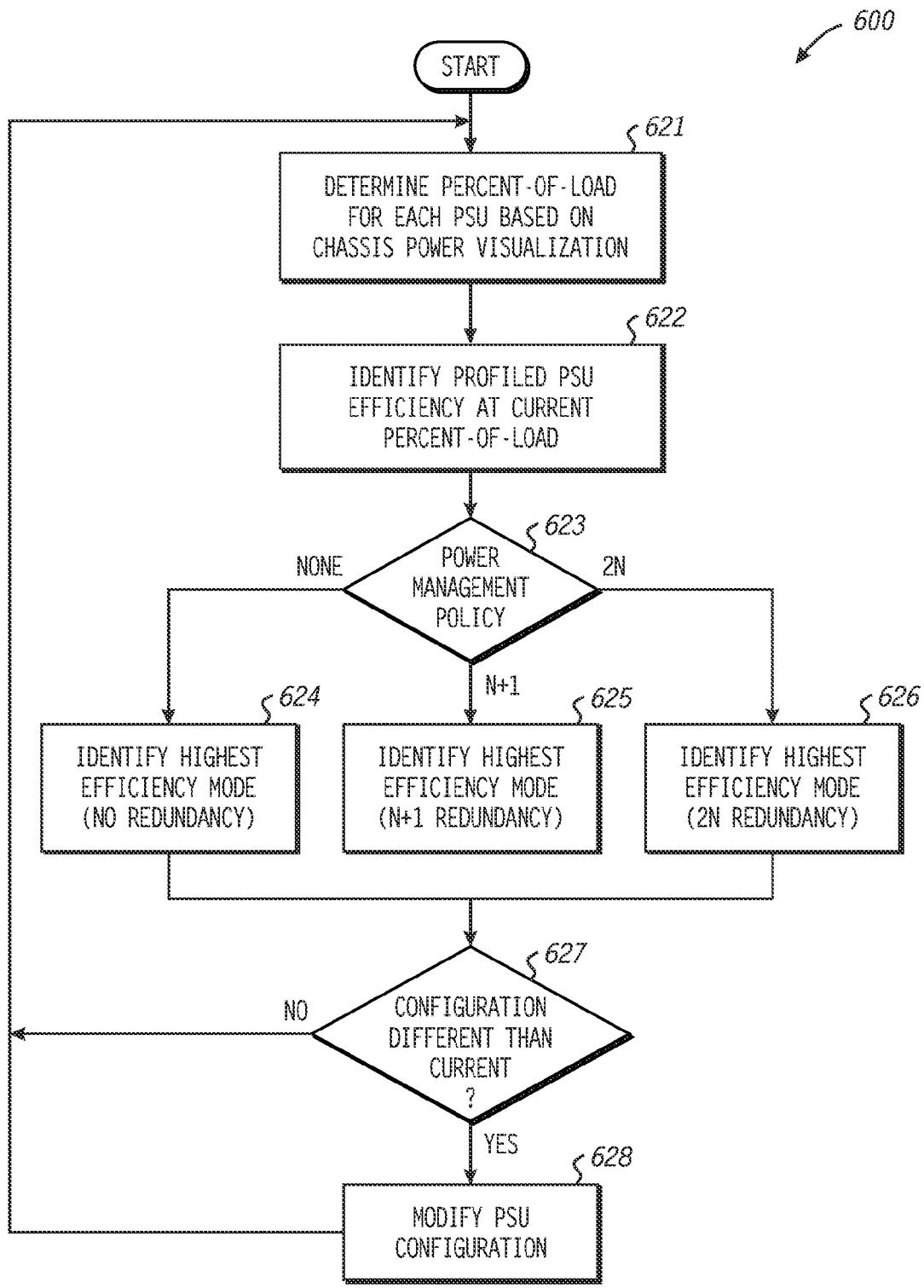
FIG. 6 is a flow diagram illustrating a method for efficiently engaging power supply units at the information handling system of FIG. 1 in accordance with a specific embodiment of the present disclosure.

FIG. 6 is a flow diagram 600 illustrating a method for efficiently engaging PSUs 11-16 at information handling system 100 of FIG. 1 in accordance with a specific embodiment of the present disclosure. Flow diagram 600 corresponds to block 420 at flow diagram 400 of FIG. 4. Flow diagram 600 begins at block 621 where power management control module 40 determines a percent-of-load for each PSU included at information handling system 100 based on a current chassis power utilization. Parallel-connected PSUs are configured to load-share, wherein each PSU contributes a portion of the chassis power utilization. Power management control module 40 polls each PSU and determines a percent-of-load for each respective PSU based on a corresponding output power provided by the PSU, and the specified maximum output power capability of that PSU. For example, if four PSUs, such as PSUs 11-14, are each engaged and each supplying 500 watts of power to information handling system 100, and each PSU is capable of delivering a maximum of 1000 watts of power, then each PSU of PSUs 10-13 is operating at 50 percent-of-load. Because PSUs 15-16 are not presently engaged, they are each operating at zero percent-of-load. Once a percent-of-load is determined for each PSU, the flow proceeds to block 622 where a previously prepared power conversion efficiency profile corresponding to each PSU is used to identify a power conversion efficiency of each PSU based on the current percent-of-load of the respective PSU.

The flow proceeds to decision block 623 where a desired power management policy is determined. A power management policy can include one or more PSU redundancy policies. A PSU redundancy policy specifies how many additional PSUs are engaged, so that in the event that one or more PSUs fail, the remaining operating PSUs are still capable of providing the power demand of information handling system 100. Therefore, a PSU redundancy policy imposes a minimum number of PSUs that can be engaged based on the current power demand of information handling system 100. Power management control module 40 is configured to engage additional PSUs if it determines that doing so will decrease the total amount of power consumed by PSUs 11-16 while supplying the current chassis power utilization.

If the current power management policy specifies that no PSU redundancy policy is desired, the flow proceeds to block 624 where power management control module 40 identifies an appropriate number of PSUs that together supply the current power demand of information handling system most efficiently based on the power conversion efficiency profile of the PSUs. As previously described with reference to graph 300 at FIG. 3, a PSU may operate most efficiently when it is providing an amount of power that is, for example, approximately one half of its maximum specified capability. Thus, engaging a surplus of PSUs (more PSUs than minimally required to provide the current power demand of information handling system 100 with the specified PSU redundancy) so that each engaged PSU is supplying an amount of power equal to approximately one half of its power capability, can improve the total operating efficiency of a power delivery module. A power conversion efficiency profile associated with each PSU provides the necessary power conversion efficiency information needed by power management control module 40 to identify a highest efficiency mode of operation.

For example, if the current power demand of information handling system 100 is 900 watts, and each PSU of PSUs 11-16 is capable of delivery 1000 watts of power, a single PSU is capable of providing the required power, but by engaging two PSUs, the two engaged PSUs together operate with greater overall efficiency compared to if only one PSU is engaged. Accordingly, power management control module 40 will engage two PSUs. After a desired number of PSUs have been identified, the flow proceeds to decision block 627 where power management control module 40 determines if the current number of engaged PSUs is different from the desired number. If the current number of engaged PSUs is equal to the desired number, the flow returns to block 621 where power management control module 40 once again evaluates the current power demand of the chassis and the percent-of-load of each associated PSU. If the current number of engaged PSUs is not equal to the desired number, the flow proceeds to block 628 where the PSU configuration is modified by engaging the desired number of PSUs.

Engaging a select number of PSU to provide the current (total) amount of power to be supplied to information handling system 100 is determined based on four simultaneous considerations: 1) providing a minimum number of PSUs; 2) satisfying a PSU redundancy policy; 3) improving power conversion efficiency; and 4) changes in configuration of information handling system 100. A minimum number of PSUs is determined based on the total amount of power currently being consumed by information handling system 100, wherein a sufficient number of PSUs are engaged to provide this current power demands. A PSU redundancy policy, if present, dictates that a surplus number of PSU be engaged to provide a power delivery capability above and beyond the minimum number of PSUs sufficient to provide the current power requirements of information handling system 100 in the event of a failure or an intentional disengagement of one or more PSUs. For example, the PSU redundancy policy may specify that the current amount of power continues to be provided by power delivery module 10 following a failure of any one PSU, a failure or intentional disengagement of one half of the engaged PSUs, or another unanticipated event.

Improving the power conversion efficiency of power delivery module 105 based on the power conversion efficiency profile associated with each PSU can be provided by iterative algorithms wherein calculations are performed to simulate hypothetical configurations of PSUs that include an addition of one or more PSU, or the substitution of one or more PSUs for another selection of one or more PSUs. The calculations determine whether the overall power conversion efficiency provided by power delivery module 10 is increased or decreased for each hypothetical configuration. The simulation algorithm can use an exhaustive approach, or it can include optimizations based on the characteristics of the power conversion efficiency profile information. A select number of PSUs are subsequently engaged corresponding to the configuration that is predicted to provide substantially optimal power conversion efficiency based on the iterative calculations. The first three considerations can be evaluated periodically, e.g. every two seconds, so that adjustments can be made to the number of engaged PSUs based on changes in the power demands of information handling system 100 resulting from a change in the amount of computational work being performed. Furthermore, chassis management control module 30 is configured to alert power management control module 40 prior to making a change in the configuration of information handling system, so that additional PSUs can be engaged to provide for an impending increase in power demands. For example, chassis management control module 30 can alert power management control module 40 when it intends to restore to full operation a server node that was previously in a power conservation mode.

Returning to decision block 623, if the current power management policy specifies that a N+1 PSU redundancy policy is desired, the flow proceeds to block 625, where power management control module 40 identifies an appropriate number of PSUs that together can supply the current power demand of information handling system most efficiently while also making certain that any one engaged PSU can fail and the remaining engaged PSUs will be capable of supplying the power demand of information handling system 100. After a desired number of PSUs have been identified, the flow proceeds to decision block 627, as previously described.

Returning to decision block 623, if the current power management policy specifies that a 2N PSU redundancy policy is desired, the flow proceeds to block 626, where power management control module 40 identifies an appropriate number of PSUs that together supply the current power demand of information handling system most efficiently while also making certain that half of the engaged PSU can fail or be taken off-line and the remaining engaged PSUs will be capable of supplying the power demand of information handling system 100. A 2N PSU redundancy policy can be desirable where the available PSUs are divided into two sets, wherein each set is capable of separately providing sufficient power. Each of the two sets can include an independent input power distribution and separate circuit breaker capability. Thus, one of the two sets can be completely disengaged to support maintenance operations or in the event of failure of one or more individual PSUs, and the remaining set is still capable of supplying adequate power to maintain the operation of information handling system 100. After a desired number of PSUs have been identified, the flow proceeds to decision block 627, as previously described.

The following table illustrates three example configurations for an information handling system utilizing six PSUs based on a range of chassis power demand. In this table, each PSU is capable of delivering a maximum of 2300 watts of power and each has the same power conversion efficiency profile.

| Chassis Power Demand (watts) | 2N Redundancy Configuration | Somewhat efficient Configuration | Most efficient Configuration |
| --- | --- | --- | --- |
| 1500 | 6 PSU @ 11% Load (72% efficiency) | 1 PSU @ 64% Load (89% efficiency) | 2 PSU @ 32% Load (90% efficiency |
| 2100 | 6 PSU @ 14% Load (72% efficiency) | 1 PSU @ 89% Load (88% efficiency) | 2 PSU @ 45% Load (91% efficiency) |
| 2400 | 6 PSU @ 17% Load (72% efficiency) | 4 PSU @ 25% Load (85% efficiency) | 2 PSU @ 51% Load (90% efficiency) |
| 2700 | 6 PSU @ 19% Load (72% efficiency) | 4 PSU @ 29% Load (85% efficiency) | 2 PSU @ 57% Load (90% efficiency) |
| 3000 | 6 PSU @ 21% Load (85% efficiency) | 4 PSU @ 32% Load (90% efficiency) | 2 PSU @ 65% Load (90% efficiency) |
| 3600 | 6 PSU @ 25% Load (85% efficiency) | 4 PSU @ 76% Load (89% efficiency) | 4 PSU @ 38% Load (90% efficiency) |

The first column represents a current power demand of information handling system 100 over a range of 1500 watts to 3600 watts. The second column illustrates a 2N PSU redundancy policy wherein six PSUs are arranged as two sets of three, and wherein all six PSUs are engaged during normal operation. In this configuration, the efficiency of the power delivery module ranges from 72% to 85%. The third column illustrates a scenario where a greater or fewer number of PSUs are engaged based on chassis power demand and the power conversion efficiency of the PSUs. In this configuration, the efficiency of the power delivery module ranges from 85% to 90%. The final column illustrates a configuration of PSUs based on the present disclosure. Power management control module 40 engages a number of PSUs based on percent-of-load and a power conversion efficiency profile associated with each PSU, and achieves power conversion efficiencies ranging from 90% to 91%.

Figure 7:
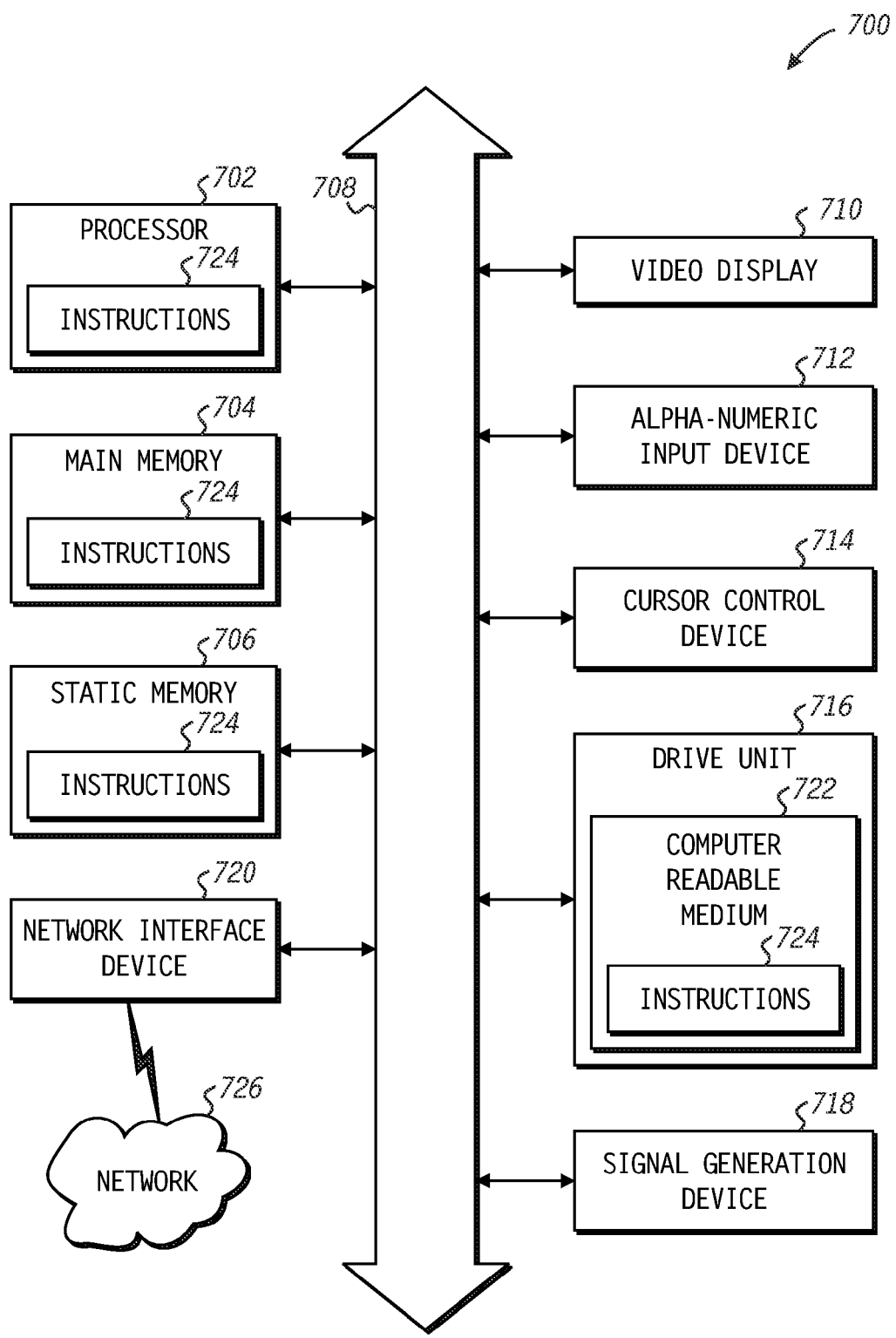
FIG. 7 shows an illustrative embodiment of a general computer system in accordance with at least one embodiment of the present disclosure.

FIG. 7 shows an illustrative embodiment of an implementation of information handling system 100 as a general computer system 700 in accordance with at least one embodiment of the present disclosure. The computer system 700 can include a set of instructions that can be executed to cause the computer system to perform any one or more of the methods or computer based functions disclosed herein. The computer system 700 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 700 can also be implemented as or incorporated into various devices, such as a personal computer (PC), a communications device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single computer system 700 is illustrated, the term "system" shall also be taken to include any collection of systems or sub-systems that individually or jointly execute a set, or multiple sets, of instructions to perform one or more computer functions.

The computer system 700 may include a processor 702, e.g., a central processing unit (CPU), a graphics processing unit (GPU), or both. Moreover, the computer system 700 can include a main memory 704 and a static memory 706 that can communicate with each other via a bus 708. As shown, the computer system 700 may further include a video display unit 710, such as a liquid crystal display (LCD), an organic light emitting diode (OLED), a flat panel display, a solid state display, or a cathode ray tube (CRT). Additionally, the computer system 700 may include an input device 712, such as a keyboard, and a cursor control device 714, such as a mouse. The computer system 700 can also include a disk drive unit 716, a signal generation device 718, such as a speaker or remote control, and a network interface device 720.

In a particular embodiment, as depicted in FIG. 7, the disk drive unit 716 may include a computer-readable medium 722 in which one or more sets of instructions 724, e.g. software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media. The network interface device 720 can provide connectivity to a network 726, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 724 or receives and executes instructions 724 responsive to a propagated signal, so that a device connected to a network 726 can communicate voice, video or data over the network 726. Further, the instructions 724 may be transmitted or received over the network 726 via the network interface device 720.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims.

What is claimed is:

1. In an information handling system comprising a plurality of power supply units (PSUs) to supply power to one or more components of the information handling system, a method comprising:
    determining, for each PSU, a power conversion efficiency profile for the PSU using a power management control module of the information handling system, the power conversion efficiency profile representing a power conversion efficiency of the PSU for each of one or more power outputs of the PSU;
    determining a maximum amount of power consumed during operation of the one or more components;
    determining a minimum number of PSUs capable of providing the maximum amount of power;
    determining, based on a PSU redundancy policy of the information handling system, a first number of PSUs greater than the minimum number of PSUs, the policy specifying a number of additional PSUs to engage so that if one or more PSUs fails during operation, a remaining number of functional PSUs is capable of supplying the maximum amount of power;
    determining a first amount of power consumed at inputs of the first number of PSUs during operation of the one or more components; and
    determining a second number of PSUs to engage to provide power to the one or more components, the second number greater than the first number of PSUs, wherein a total amount of power consumed at inputs of the second number of PSUs during operation of the information handling system is less than the first amount of power, the determining based on the power conversion efficiency profile of each PSU.

2. The method of claim 1, wherein determining a power conversion efficiency profile for a PSU comprises:
  determining a power conversion efficiency of the PSU for each of a plurality of power outputs of the PSU; and
  for each determined power conversion efficiency, storing a value representative of the power conversion efficiency in a data structure in a storage component, the data structure representing the power conversion efficiency profile of the PSU.

3. The method of claim 2, wherein determining a power conversion efficiency of the PSU for a power output comprises:
  determining a power input of the PSU to generate the power output; and
  determining the power conversion efficiency of the PSU for the power output based on a ratio of the power output to the power input.

4. The method of claim 1, wherein determining a power conversion efficiency profile for a PSU comprises accessing a data structure from a storage component using the power management control module, the data structure comprising a plurality of predetermined values representative of the power conversion efficiency of the PSU at each of a plurality of corresponding power outputs of the PSU.

5. The method of claim 1, wherein each PSU of the plurality of PSUs is of the same type, and wherein determining the power conversion efficiency profile for each PSU comprises determining a single power conversion efficiency profile representative of every PSU of the plurality of PSUs.

6. An information handling system comprising:
  a plurality of system components;
  a plurality of power supply units (PSUs) to supply power to one or more of the system components; and
  a power management control module to:
    determine, for each PSU, a power conversion efficiency profile for the PSU, the power conversion efficiency profile representing a power conversion efficiency of the PSU for each of one or more power outputs of the PSU;
    determine a maximum amount of power consumed during operation of the system components;
    determine a minimum number of PSUs capable of providing the maximum amount of power;
    determine, based on a PSU redundancy policy of the information handling system, a first number of PSUs greater than the minimum number of PSUs, the policy specifying a number of additional PSUs to engage so that if one or more of the PSUs fails during operation, a remaining number of functional PSUs is capable of supplying the maximum amount of power;
    determine a first amount of power consumed at inputs of the first number of PSUs during operation of the information handling system; and
    determine a second number of PSUs to engage to provide power to the system components, the second number greater than the first number of PSUs, wherein a total amount of power consumed at inputs of the second number of PSUs during operation of the information handling system is less than the first amount of power, the determining based on the power conversion efficiency profile of each PSU.

7. The information handling system of claim 6, wherein the power management control module determines a power conversion efficiency profile for a PSU by:
  determining a power conversion efficiency of the PSU for each of a plurality of power outputs by the PSU; and
  for each determined power conversion efficiency, storing a value representative of the power conversion efficiency in a data structure in a storage component, the data structure representing the power conversion efficiency profile of the PSU.

8. The information handling system of claim 7, wherein the power management control module determines a power conversion efficiency of the PSU for a power output by:
  determining a power input of the PSU to generate the power output; and
  determining the power conversion efficiency of the PSU for the power output based on a ratio of the power output to the power input.

9. The information handling system of claim 6, wherein the power management control module determines a power conversion efficiency profile for a PSU by accessing a data structure from a storage component of the information handling system using the power management control module, the data structure comprising a plurality of predetermined values representative of the power conversion efficiency of the PSU at each of a plurality of corresponding power outputs of the PSU.

10. The information handling system of claim 6, wherein:
  the information handling system comprises a server rack; and
  the plurality of system components comprises a plurality of blade servers.

11. A non-transitory computer-readable medium storing a software program, the software program comprising a set of instructions to manipulate at least one processor to:
  determine, for each PSU of a plurality of PSUs configured to supply power to one or more components of an information handling system, a power conversion efficiency profile for the PSU, the power conversion efficiency profile representing a power conversion efficiency of the PSU for each of one or more power outputs of the PSU;
  determine a maximum amount of power consumed during operation of the one or more components;
  determine a minimum number of PSUs capable of providing the maximum amount of power;
  determine, based on a PSU redundancy policy of the information handling system, a first number of PSUs greater than the minimum number of PSUs, the policy specifying a number of additional PSUs to engage so that if one or more of the PSUs fails during operation, a remaining number of functional PSUs is capable of supplying the maximum amount of power;
  determine a first amount of power consumed at inputs of the first number of PSUs during operation of the one or more components; and
  determine a second number of PSUs to engage to provide power to the one or more components, the second number greater than the first number of PSUs, wherein a total amount of power consumed at inputs of the second number of PSUs during operation of the information handling system is less than the first amount of power, the determining based on the power conversion efficiency profile of each PSU.

12. The computer-readable medium of claim 11, wherein the set of instructions to manipulate at least one processor to determine a power conversion efficiency of the PSU for a power output comprises instructions to manipulate at least one processor to:
  determine a power conversion efficiency of the PSU for each of a plurality of power outputs of the PSU; and
  for each determined power conversion efficiency, to store a value representative of the power conversion efficiency in a data structure in a storage component, the data structure representing the power conversion efficiency profile of the PSU.

13. The computer-readable medium of claim 11, wherein determining a power conversion efficiency profile for a PSU comprises:
- determining a power conversion efficiency of the PSU for each of a plurality of power outputs of the PSU; and
- for each determined power conversion efficiency, storing a value representative of the power conversion efficiency in a data structure in a storage component, the data structure representing the power conversion efficiency profile of the PSU.

14. The computer-readable medium of claim 13, wherein determining a power conversion efficiency of the PSU for a power output comprises:
- determining a power input of the PSU to generate the power output; and
- determining the power conversion efficiency of the PSU for the power output based on a ratio of the power output to the power input.

15. The computer readable medium of claim 11, wherein determining a power conversion efficiency profile for a PSU comprises accessing a data structure from a storage component using the power management control module, the data structure comprising a plurality of predetermined values representative of the power conversion efficiency of the PSU at each of a plurality of corresponding power outputs of the PSU.

16. The computer readable medium of claim 11, wherein each PSU of the PSUs is of the same type, and wherein determining the power conversion efficiency profile for each PSU comprises determining a single power conversion efficiency profile representative of every PSU.

* * * * *